United States Patent [19]

Ida

[11] Patent Number: 4,906,676

[45] Date of Patent: Mar. 6, 1990

[54] RESIN COMPOSITION CONTAINING FINE SILICA PARTICLES THEREIN

[75] Inventor: Kozo Ida, Otake, Japan

[73] Assignee: Mitsubishi Rayon Co., Ltd., Tokyo, Japan

[21] Appl. No.: 9,235

[22] Filed: Jan. 30, 1987

Related U.S. Application Data

[63] Continuation-in-part of Ser. No. 773,829, Sep. 9, 1985, abandoned.

[30] Foreign Application Priority Data

Sep. 13, 1984 [JP] Japan .................. 59-192293

[51] Int. Cl.$^4$ .............. C08K 9/06; C08K 5/54; C08K 3/36
[52] U.S. Cl. .................. 523/212; 523/213; 523/214; 524/262; 524/263; 524/265
[58] Field of Search .......... 523/212, 213, 214; 524/262, 263, 265, 847

[56] References Cited

U.S. PATENT DOCUMENTS

| | | | |
|---|---|---|---|
| 2,928,802 | 3/1960 | Rehner et al. | 523/212 |
| 2,993,809 | 7/1961 | Bueche et al. | 523/212 |
| 3,122,520 | 2/1964 | Lentz | 524/847 |
| 3,328,339 | 6/1967 | Tierney | 523/212 |
| 3,838,094 | 9/1974 | Sporck | 523/213 |
| 3,957,683 | 5/1976 | Hittmair et al. | 523/212 |
| 4,028,325 | 6/1977 | King et al. | 523/214 |
| 4,357,271 | 11/1982 | Rosenquist | 523/212 |
| 4,415,509 | 11/1983 | Toyooka et al. | 264/1.3 |
| 4,418,986 | 12/1983 | Yata et al. | 350/128 |
| 4,436,847 | 3/1984 | Wanger | 523/212 |
| 4,468,092 | 8/1984 | Inoue et al. | 350/128 |
| 4,548,469 | 10/1985 | Inoue et al. | 350/128 |
| 4,550,977 | 11/1985 | Inoue et al. | 350/128 |

FOREIGN PATENT DOCUMENTS

| | | | |
|---|---|---|---|
| 52-77154 | 6/1977 | Japan | 523/212 |
| 58-157835 | 9/1983 | Japan | 523/212 |
| 794034 | 1/1981 | U.S.S.R. | 523/213 |
| 924076 | 4/1982 | U.S.S.R. | 523/212 |
| 1604405 | 12/1981 | United Kingdom | 523/212 |

OTHER PUBLICATIONS

Katz et al.; Handbook of Fillers and Reinforcements for plastics; Van Nostrand Reinhold Co.; 1978; pp. 138–139.

Primary Examiner—Lewis T. Jacobs
Attorney, Agent, or Firm—Brumbaugh, Graves, Donohue & Raymond

[57] ABSTRACT

A resin composition suitable for various optical uses, which comprises a base resin and 0.1 to 60% based on the weight of said resin composition, of fine silica or glass particles, said fine silica or glass particles having an average particle diameter of 0.05 to 50 μm and having their surface treated with at least one silane compound selected from those represented by the following general formulae (I) to (IV):

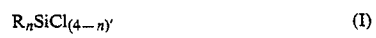

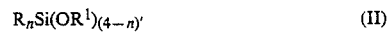

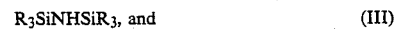

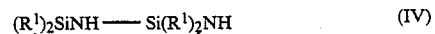

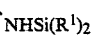

wherein n is an integer of from 1 to 3, $R^1$ is an alkyl group having 1 to 3 carbon atoms, and R is a saturated or unsaturated hydrocarbon group having 1 to 22 carbon atoms or a halogen-substituted, saturated or unsaturated hydrocarbon group having 1 to 22 carbon atoms, wherien the silane does not couple the particle and the resin.

16 Claims, 1 Drawing Sheet

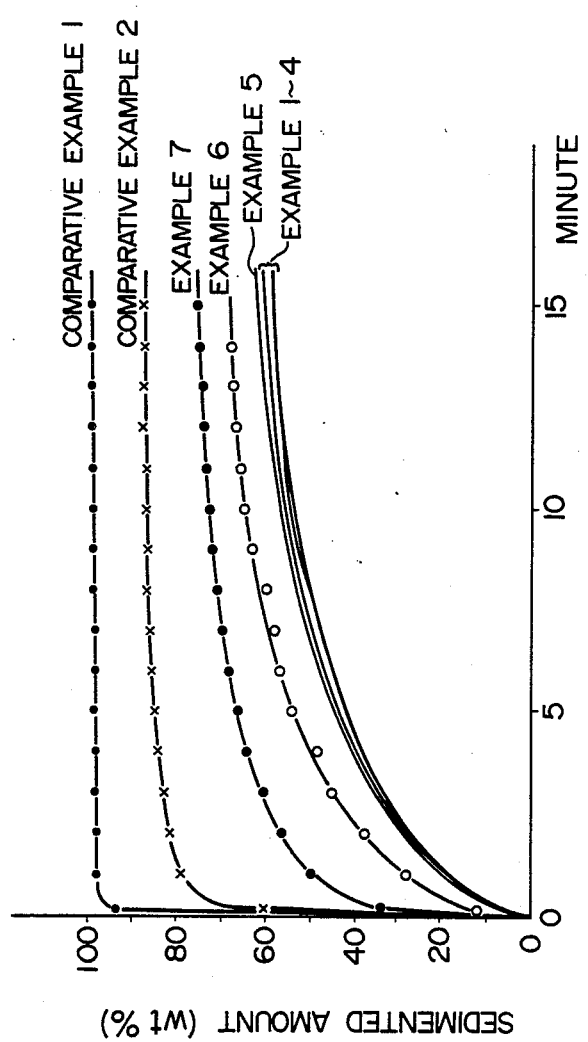

RESIN COMPOSITION CONTAINING FINE SILICA PARTICLES THEREIN

This application is a continuation-in-part of application Ser. No. 773,829 filed Sept. 9, 1985, and now abandoned.

BACKGROUND OF THE INVENTION

1. Field of the Invention

This invention relates to a resin composition containing fine silica particles having good dispersibility therein and which retains the desirable properties of light transmission, selective absorption, refraction, reflection, scattering, light emission and lighting control of the resin composition.

2. Description of the Prior Art

Synthetic resin containing fine particles of silica or glass dispersed therein are widely used, as described for example in Japanese Patent Application Kokai (Laid-Open) No. 5742/82, as materials for lighting fixtures or screens by virtue of their light diffusion property. These materials have generally been prepared either by a method which comprises dispersing fine particles of silica or glass into a transparent resin such as methacrylic or styrene resin and then forming the composition thus obtained into articles, or by a method which comprises dispersing the fine particles into monomers or a partially polymerized monomer (syrup) and then polymerizing the resulting composition to form a solid material. However, these methods have difficulties, since fine particles of silica or glass have higher specific gravities than the monomer or syrup. As a result, the particles are liable to sediment or aggregate during the polymerization or can be hardly dispersed uniformly in the resin when kneaded with resin.

Accordingly, a process has been proposed by the present inventors which comprises, in producing a light diffusive methacrylic resin sheet by mixing $SiO_2$ into methacrylic resin, first preparing a part of a syrup, mixing $SiO_2$ therewith to form so-called color master batch, and then mixing the master batch with the remainder of the syrup [Japanese Patent Application Kokai (Laid-Open) No. 16,007/82]. However, this process has disadvantages in that it involves increased number of process steps and yet the dispersion of the $SiO_2$ cannot be deemed to be perfect.

SUMMARY OF THE INVENTION

Accordingly, an object of this invention is to provide a resin composition in which silica or glass particles are uniformly dispersed and which can be easily shaped into articles.

A further object of this invention is to provide a resin composition which contains fine silica or glass particles having excellent dispersibility and which enables efficient production of shaped resin articles having stable optical properties.

Further objects of the invention will become apparent from the description of the invention which follows.

The objects of this invention are achieved by providing a resin composition which comprises a base resin and 0.1 to 60% based on the weight of the resin composition, of fine silica or glass particles, the fine silica or glass particles having an average particle diameter of 0.05 to 50 μm, and further the surface of the particles being treated with at least one silane compound selected from those represented by the following general formulae (I) to (IV):

 (I)

 (II)

$R_3SiNHSiR_3$, and (III)

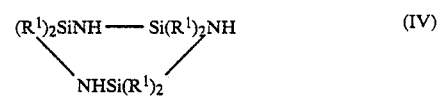 (IV)

wherein n is an integer of from 1 to 3, $R^1$ is an alkyl group having 1 to 3 carbon atoms, and R is a saturated or unsaturated hydrocarbon group having 1 to 22 carbon atoms or a halogen-substituted, saturated or unsaturated hydrocarbon group having 1 to 22 carbon atoms.

BRIEF DESCRIPTION OF THE DRAWING

The attached FIGURE is a graph showing the sedimentation velocity of silica or glass particles in a syrup.

DETAILED DESCRIPTION

The base resins usable in this invention include, for example, polymethyl methacrylate, polycarbonate, polystyrene, AS resin, ABS resin, allyl resin, polyvinyl chloride, and polyester, which are transparent in the visible ray region, but they are of course not limited thereto.

The fine particles used in this invention are composed of silica or glass preferably containing 10% or more of $SiO_2$ component. More specifically, at least one member is used selected from the group consisting of amorphous silica, crystalline silica, silicate glass, lead glass, barium glass, borosilicate glass, alkali glass, phosphate glass, ultraviolet ray transmitting colored glass, ultraviolet ray absorbing transparent glass, rare-earth containing glass such as neodymium glass, photochromic glass, photosensitive glass and other colored glass. Further, the average particle diameter of the fine silica or glass particles is selected from the range of 0.05 to 50 μm, because when the average diameter is less than 0.05 μm, the objects of this invention cannot be attained, whereas when it exceeds 50 μm uneven optical properties will result therefrom.

In this invention, a base resin and fine silica or glass particles, are preferably selected, depending on the end use of the resin composition, so as to give an appropriate difference between the refractive indexes of the components (resin and particles). For applications wherein as small light scattering as possible is desired, for example in see-through materials, the refractive indexes of the components have desirably no or small difference from each other, whereas for applications wherein as large light scattering as possible is required, for example in screens, those components are desirably selected which have a large difference between their refractive indexes.

In this invention, the surface of fine silica or glass particles as mentioned above are treated with a specified silane compound. Examples of the compounds corresponding to the formula (I) include trichloromethylsilane, dichlorodimethylsilane, chlorotrimethylsilane, trichloroethylsilane, dichlorodiethylsilane, chlorotriethylsilane, trichlorophenylsilane, trichlorooctylsilane, and 3-chloropropyltrichlorosilane.

Examples of the compounds corresponding to the general formula (II) include trimethylmethoxysilane, trimethylethoxysilane, dimethyldimethoxysilane, dimethyldiethoxysilane, methyltrimethoxysilane, methyltriethoxysilane, triethylmethoxysilane, triethylethoxysilane, n-octyltrimethoxysilane, n-octyltriethoxysilane, phenyltrimethoxysilane, phenyltriethoxysilane, octadecyltrimethoxysilane, octadecyltriethoxysilane, chloroethyltriethoxysilane, chlorophenyltriethoxysilane, and (heptadecachloro-1,1,2,2-tetrahydrodecyl)-1-triethoxysilane.

Further, examples of the compounds corresponding to the general formula (III) include hexamethyldisilazane and the like, and those corresponding to the general formula (IV) include hexamethylcyclotrisilazane and the like.

It is assumed that all of these silane compounds react with silanol groups present on the surface of silica or glass particles, thus replacing the surface with organics groups and thereby converting the hydrophilic particles into hydrophobic ones. It is the hydrophobicity of the coated particles which leads to the improved dispersibility of the particles in the base material.

It has been previously known to add a silane coupling agent in order to improve the bonding of synthetic resin with silica or glass. However, though the mechanical strength of shaped articles from the resin composition are improved by this method, there remains a problem in production in that, particularly when such a composition is cast polymerized, the sticking of the shaped article in the mold is likely to occur. In contrast to the above-mentioned, it has been confirmed that such a phenomenon does not occur in the composition of this invention in which the silane does not couple the suspended particles to the resin.

The production of shaped articles using the resin composition of this invention can be performed by a process comprising compounding fine silica or glass particles which have been surface treated beforehand by a silane compound with pellets of base resin and then shaping into desired articles by injection molding or extrusion or a process comprising dispersing the particles into a monomer or syrup from which the base resin is formed, and then polymerizing the mixture to obtain a solid article.

The treatment of fine silica or glass particles with a silane compound can be conducted in a gas phase or in a liquid medium. The reaction time varies depending on moisture content, temperature, or the kind of the silane compound, but is usually about 30 minutes to about 1 week. It is also possible in the treatment to choose the starting material of the resin (monomer) as the solvent for the reaction. Preferred amount of the silane compound to be reacted with fine silica particles is normally determined according to the following equation, but a somewhat larger amount is also acceptable:

$$X(g) = \frac{M(g) \times S(m^2/g)}{W \times \alpha(m^2/g)}$$

wherein
X: amount of silane compound used
M: amount of fine silica particles used
S: specific surface area of fine silica particles
W: molecular weight of silane compound
$\alpha$: coefficient satisfying $1 \leq \alpha \leq 3$ Example Examples of embodiments of this invention will be illustrated below in comparison with Comparative Examples, but the invention is in no way limited thereto.

Surface treatment with silane compound

Several kinds of fine silica particles shown in the TABLE (in each case the amount used being 300 g) were treated with a silane compound. The amount of the silane compound used was 0.3% by weight relative to the fine silica particles. The amount of the solvent used for the reaction was equal to that of the fine silica particles in weight. When the reaction was conducted in a solvent, the reaction mixture was stirred at 23° C. for 24 hours, then the solvent was removed by filtration, and the silica particles thus obtained was subject to heat treatment at 110° C. for 60 minutes. In a gas phase reaction, the fine silica particles and the silane compound were mixed in a reactor and then heated at 110° C. for 60 minutes to effect the reaction.

Production of silica-containing resin Comparative Example 1 and Examples 1 to 7

Into 100 parts of partially polymerized methyl methacrylate (syrup conversion: 20%), were compounded a crystalline silica (refractive index: 1.54) having an average particle diameter of 6 μm, an amorphous silica (refractive index: 1.46) having an average particle diameter of 10 μm, or a neodymium glass having an average particle diameter of 12 μm, respectively shown in the TABLE, and dispersed thoroughly. Into the resulting mixture, were further added and dissolved 0.01 part of sodium dioctylsulfosuccinate (as dispersing agent and mold release agent) and 0.04 part of 2,2'azobis(2,4-dimethylvaleronitrile) (as polymerization catalyst). The mixture thus obtained was degassed and cast into a mold of tempered glass provided beforehand so as to give a plate thickness of 2 μm. The mold was dipped in warm water at 65° C. for 180 minutes, then kept in an air oven at 110° C. for 120 minutes to complete polymerization. Then the mold was cooled and the sheet thus formed was taken out of it.

Comparative Example 2

A partially polymerized methyl methacrylate (syrup conversion: 5.2%) was mixed with 13% by weight of styrene and 32% by weight of SiO2 having an average particle diameter of 6 μm to give a syrup containing SiO2. The resulting syrup was mixed with 0.3% by weight of azobisisobutyronitrile, a polymerization initiator, and the mixture was cast into a cell assembly formed of tempered glass mold, and polymerized in a water bath at 70° C. for 210 minutes and further in an air oven at 130° C. for 120 minutes to give a plate-formed prepolymer. The prepolymer was treated with a conventional crusher and a pulverizer to obtain prepolymer granules of about 4 mm diameter.

Into a partially polymerized methyl methacrylate (syrup conversion: 7%) was added 5.2% by weight of the prepolymer granules obtained above, and further a polymerization initiator was added thereto. The resulting syrup was cast into a cell assembled with a mold whose both sides were formed of tempered glass and gaskets formed of polyvinyl chloride, and polymerized in a water bath and an air oven in a conventional manner to obtain a plate-formed polymethyl methacrylate of 2 mm thickness.

Determination of sedimentation velocity

In order to know the dispersion characteristics of silica particles in the products obtained as described in Examples and Comparative Examples properly in a short time, the sedimentation velocity of individual lot of fine silica particles were determined.

The determination was conducted by dispersing 2 parts by weight of an individual lot of fine silica particles in 98 parts by weight of methyl methacrylate with stirring and then measuring the amount (weight) of sedimented fine silica particles with time which elapsed from the stop of stirring. The depth of the liquid was 50 μm.

The results obtained are as shown in the FIGURE. It has been confirmed that the fine silica particles used in Examples 1 to 7 gave smaller sedimentation velocity (less sedimented amount at a fixed elapsed time) and thus showed more excellent dispersibility than those used in Comparative Examples 1 to 2.

The excellent dispersibility of the present composition has been also confirmed from the fact that the optical uniformity was observed in all the sheets obtained according to Examples 1 to 7 while the optical unevenness was observed in those obtained according to Comparative Examples 1 to 2.

TABLE

| Sample | | Fine silica particles | | Surface treatment with silane compound | |
|---|---|---|---|---|---|
| | | Average diameter (μm) | Type | Silane compound | Reaction solvent |
| Comparative | 1 | 6 | Crystalline silica | Not used | Not used |
| Example | 2 | " | " | Color master batch method | |
| Example | 1 | " | " | Hexamethyldisilazane | Gas phase |
| | 2 | " | " | Hexamethyldisilazane | Xylene |
| | 3 | " | " | Hexamethyldisilazane | Methyl methacrylate |
| | 4 | " | " | n-Octyltriethoxy-silane | Water |
| | 5 | " | " | 3-Chloropropyltri-chlorosilane | Methyl methacrylate |
| | 6 | 10 | Amorphous silica | Hexamethylene-disilazane | " |
| | 7 | 12 | Neodymium glass | Hexamethylene-disilazane | " |

I claim:

1. A resin composition comprising a base resin which is transparent in the visible ray region and 0.1 to 60%, based on the weight of said resin composition, of fine silica or glass particles dispersed in said resin, said fine silica or glass particles having an average particle diameter of 0.05 to 50 μm, and further the surface of the particles being treated to render the surface hydrophobic with at least one silane compound selected from those represented by the following general formulae (I) to (IV):

$$R_nSiCl_{(4-n)'} \quad (I)$$

$$R_nSi(OR^1)_{(4-n)'} \quad (II)$$

$$R_3SiNHSiR_3, \text{ and} \quad (III)$$

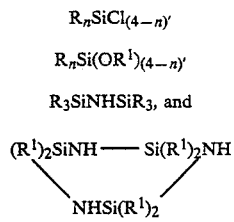 (IV)

wherein n is an integer of from 1 to 3, $R^1$ is an alkyl group having 1 to 3 carbon atoms, and R is a saturated or unsaturated hydrocarbon group having 1 to 22 carbon atoms or a halogen-substituted, saturated or unsaturated hydrocarbon group having 1 to 22 carbon atoms, wherein the silane does not couple the particles and the resin.

2. A resin composition according to claim 1, wherein said base resin is a member selected from the group consisting of polymethyl methacrylate, polycarbonate, polystyrene, AS resin, ABS resin, allyl resin, polyvinyl chloride, and polyester which are transparent in the visible ray region.

3. A resin composition according to claim 1, wherein said fine silica or glass particles are at least one member selected from the group consisting of amorphous silica, crystalline silica, silicate glass, lead glass, barium glass, borosilicate glass, alkali glass, phosphate glass, ultraviolet ray transmitting colored glass, ultraviolet ray absorbing transparent glass, infrared ray transmitting colored glass, infrared ray absorbing transparent glass, rare-earth containing glass, photochromic glass, and photosensitive glass.

4. A resin composition according to claim 2, wherein said fine silica or glass particles are at least one member selected from the group consisting of amorphous silica, crystalline silica, silicate glass, lead glass, barium glass, borosilicate glass, alkali glass, phosphate glass, ultraviolet ray transmitting colored glass, ultraviolet ray absorbing transparent glass, infrared ray transmitting colored glass, infrared ray absorbing transparent glass, rare-earth containing glass, photochromic glass, and photosensitive glass.

5. A resin composition according to claim 1, wherein the refractive indices of the base resin and the fine silica or glass particles are equal or close to each other.

6. A resin composition according to claim 1, wherein said glass contains 10% by weight or more of $SiO_2$ component.

7. A resin composition according to claim 1, wherein the silane compound is selected from the group consisting of trichloromethylsilane, dichlorodimethylsilane, chlorotrimethylsilane, trichloroethylsilane, dichlorodiethylsilane, chlorotriethylsilane, trichlorophenylsilane, trichlorooctylsilane, 3-chloropropyltrichlorosilane, trimethylmethoxysilane, trimethylethoxysilane, dimethyldimethoxysilane, dimethyldiethoxysilane, methyltrimethoxysilane, methyltriethoxysilane, triethylmethoxysilane, triethylethoxysilane, n-octyltrimethoxysilane, n-octyltriethoxysilane, phenyltrimethoxysilane, phenyltriethoxysilane, octadecyltrimethoxysilane, octadecyltriethoxysilane, chloroethyltriethoxysilane, chlorophenyltriethoxysilane, and (heptadecachloro-1,1,2,2-tetrahydrodecyl)-1-triethoxysilane.

8. A resin composition according to claim 1, wherein the silane compound is selected from the group consisting of hexamethyldisilazane and hexamethylcyclotrisilazane.

9. A resin composition according to claim 1, wherein R is a saturated hydrocarbon or a halogen-substituted saturated hydrocarbon having 1 to 22 carbon atoms.

10. A resin composition comprising a base resin comprising a member selected from polymethylmethacrylate and polystyrene which is transparent in the visible ray region and 0.1 to 60%, based on the weight of said resin composition, of fine silica or glass particles dispersed in said resin, said fine silica or glass particles having an average particle diameter of 0.05 to 50 μm, and further the surface of the particles being treated to render the surface hydrophobic with at least one silane compound selected from those represented by the following general formulae (I) to (IV):

$$R_nSiCl_{(4-n)'} \quad (I)$$

$$R_nSi(OR^1)_{(4-n)'} \quad (II)$$

$$R_3SiNHSiR_3, \text{ and} \quad (III)$$

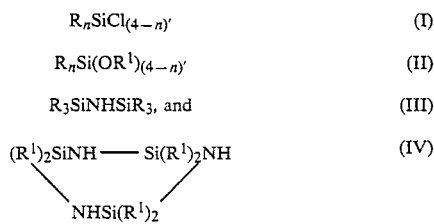 (IV)

wherein n is an integer of from 1 to 3, $R^1$ is an alkyl group having 1 to 3 carbon atoms, and R is a saturated or unsaturated hydrocarbon group having 1 to 22 carbon atoms or a halogen-substituted, saturated or unsaturated hydrocarbon group having 1 to 22 carbon atoms, wherein the silane does not couple the particles and the resin.

11. A resin composition according to claim 10, wherein said fine silica or glass particles are at least one member selected from the group consisting of amorphous silica, crystalline silica, silicate glass, lead glass, barium glass, borosilicate glass, alkali glass, phosphate glass, ultraviolet ray transmitting colored glass, ultraviolate ray absorbing transparent glass, infrared ray transmitting colored glass, infrared ray absorbing transparent glass, rare-earth containing glass, photochromic glass, and photosensitive glass.

12. A resin composition according to claim 10, wherein the refractive indices of the base resin and the fine silica or glass particles are equal or close to each other.

13. A resin composition according to claim 10, wherein said glass contains 10% by weight or more of $SiO_2$ component.

14. A resin composition according to claim 10, wherein the silane compound is selected from the group consisting of trichloromethylsilane, dichlorodimethylsilane, chlorotrimethylsilane, trichloroethylsilane, dichlorodiethylsilane, chlorotriethylsilane, trichlorophenylsilane, trichlorooctylsilane, 3-chloropropyltrichlorosilane, trimethylmethoxysilane, trimethylethoxysilane, dimethyldimethoxysilane, dimethyldiethoxysilane, methyltrimethoxysilane, methyltriethoxysilane, triethylmethoxysilane, triethylethoxysilane, n-octyltrimethoxysilane, n-octyltriethoxysilane, phenyltrimethoxysilane, phenyltriethoxysilane, octadecyltrimethoxysilane, octadecyltriethoxysilane, chloroethyltriethoxysilane, chlorophenyltriethoxysilane, and (heptadecachloro-1,1,2,2-tetrhydrodecyl)-1-triethoxysilane.

15. A resin composition according to claim 10, wherein the silane compound is selected from the group consisting of hexamethydisilazane and hexamethylcyclotrisilazane.

16. A resin composition according to claim 10, wherein R is a saturated hydrocarbon or a halogen-substituted saturated hydrocarbon having 1 to 22 carbon atoms.

* * * * *